Nov. 4, 1941.  O. C. JENSEN  2,261,649
PARKING METER
Original Filed Dec. 19, 1936  2 Sheets-Sheet 1
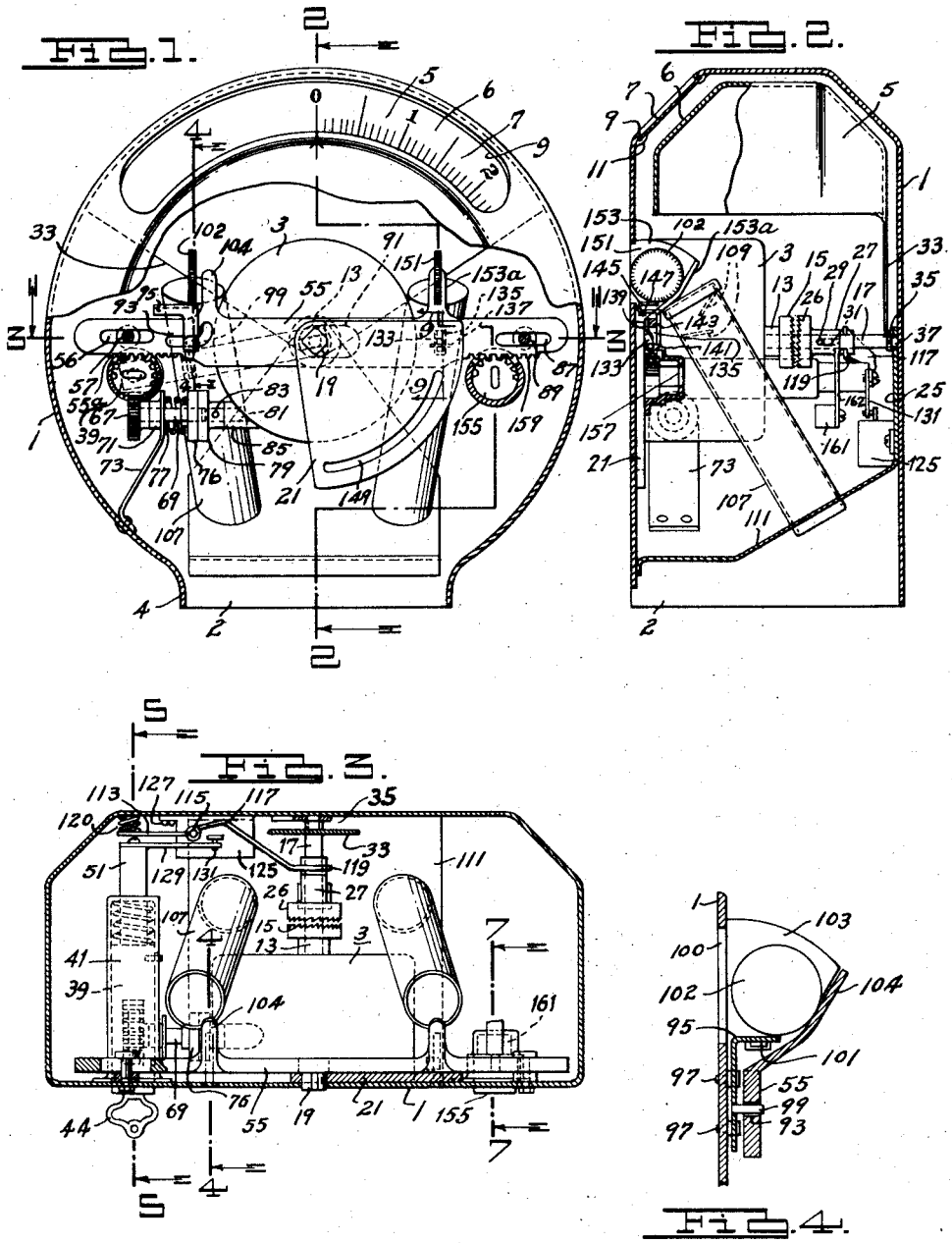
INVENTOR.
Otto C. Jensen
BY Dike, Calvert + Porter
ATTORNEYS

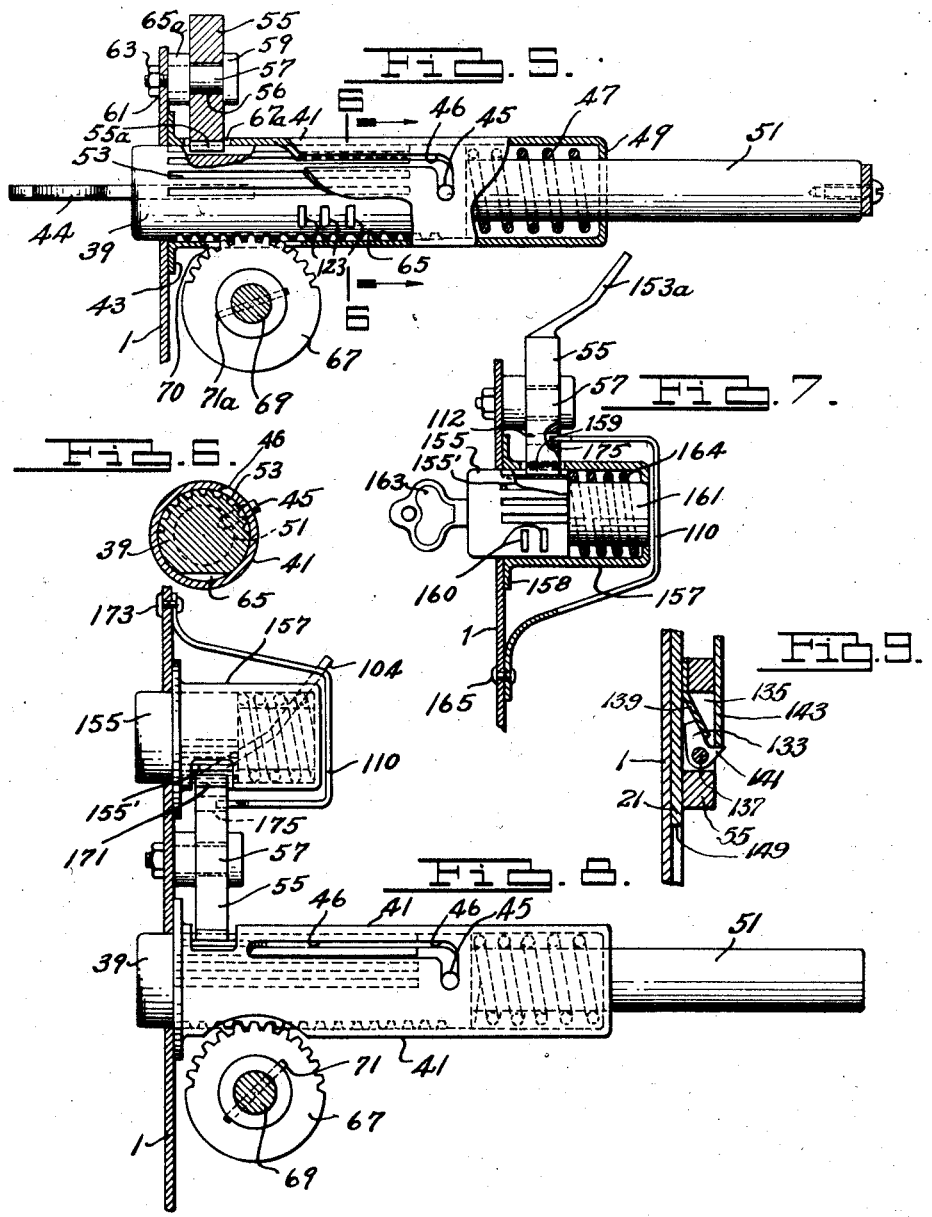

Patented Nov. 4, 1941

2,261,649

UNITED STATES PATENT OFFICE 2,261,649

PARKING METER

Otto C. Jensen, Detroit, Mich., assignor, by mesne assignments, to Mary W. Moody, Washington, D. C.

Continuation of application Serial No. 116,772, December 19, 1936. This application May 8, 1941, Serial No. 392,521

13 Claims. (Cl. 194—32)

My invention pertains to time measuring devices and more particularly to an improved method of and means for regulating the parking interval of parked vehicles.

The difficult problem of efficiently regulating the parking of vehicles on public streets in congested areas cannot be solved by enacting numerous restrictive ordinances because of the tendency of the drivers to ignore such ordinances. To detail sufficient patrolmen to efficiently enforce such ordinances by marking the tires and noting the parking times involves great expense and is often impractical because of the great number of men that would be required.

The ideal solution of this problem apparently resides in the provision of automatic means which may be operated by the car drivers whereby they may rent the available parking spaces from the city when they park their cars. Applicant is aware that previous attempts have been made to solve this problem by providing curb-installed parking meters for automatically indicating the parking time and collecting a parking fee. However, so far as applicant is aware, these devices have proven unsatisfactory in practice because they did not eliminate the necessity for close police supervision, and they failed to provide for sufficient flexibility of operation to accommodate the various parking fees for different parking periods. Also such prior art devices have been unreliable, and required close attention for maintenance and operation. Furthermore, after a driver had overparked his car it was easy for him to drive off and ignore the parking meter.

It is accordingly an object of my invention to provide an improved parking meter which is reliable and positive in its operation and sufficiently flexible in its arrangement to readily accommodate various parking schedules, and which cannot be ignored by a driver after he has overparked.

It is also an object of my invention to provide a parking meter, comprising a time measuring device, a parking time indicator, personal-key actuated means for drivingly connecting the indicator with the time measuring device, and meter-key controlled means for disconnecting the indicator from said time measuring device at the end of the desired parking period.

Another object of my invention is to provide in such a parking meter coin-controlled means for collecting an initial fee at the beginning of the parking period and additional coin-controlled means for collecting another fee if the driver parks the car over a predetermined time interval.

It is also an object of my invention to provide a parking meter, comprising a time measuring clock mechanism, a parking time indicator, a clutch for drivingly connecting the indicator with the clock mechanism, means for operating said clutch and means winding the clock mechanism each time the parking meter is put into use.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Fig. 1 is a front elevational view of an embodiment of my parking meter with a portion of the front wall thereof broken away to show the coordination of most of the movable parts therein;

Fig. 2 is a cross-sectional view taken substantially on the line 2—2 of Fig. 1;

Fig. 3 is a horizontal sectional view taken substantially on the line 3—3 of Fig. 1;

Fig. 4 is an enlarged fragmentary section taken substantially on line 4—4 of Figs. 1 and 3.

Fig. 5 is an enlarged fragmentary section taken substantially on line 5—5 of Fig. 3 and illustrating a personal-key controlled mechanism of the parking meter.

Fig. 6 is a section taken on line 6—6 of Fig. 5;

Fig. 7 is an enlarged fragmentary section taken on line 7—7 of Fig. 3; and

Fig. 8 is a sectional view similar to Fig. 5 and showing a modified arrangement wherein the two key-controlled mechanisms of the parking meter are disposed in close proximity to each other.

Fig. 9 is an enlarged fragmentary section taken substantially on the line 9—9 of Fig. 1.

Referring more particularly to the drawings, my parking meter comprises a casing I which is preferably constructed of sheet metal and houses the operating parts of the meter. The casing I is of substantially cylindrical shape and has bevelled corners between the back wall and the side wall and a flared base 2 which is open at the bottom as shown in Figs. 1 and 2. For measuring the time of the parking period, I provide a time measuring device 3 (Figs. 2 and 3) which may be any one of a number of suitable clock mechanisms that are available on the market. The time measuring device 3 is mounted on the front wall of the casing I by any suitable means such as screws or bolts, for instance. For indicating the parking period, I provide a movable indicator 5 (Figs. 1 and 2) which is operated by the time measuring device 3, in a manner to be described hereinafter. The indicator 5, which is made of any suitable lightweight material, is provided with an inclined scale 6 adjacent a transparent window 7. The scale 6 may be painted or marked upon the indicator 5 in any suitable manner. The window comprises an arcuate piece of any suitable transparent material which is secured in an aperture 9, provided in a bevelled portion of the front wall of the casing 1. The transparent piece is secured in the casing 1 by means of a suitable frame 11 which is secured to said casing in any suitable manner.

In order drivingly to connect the indicator 5 with the time measuring device 3, a tubular shaft 13 (Figs. 1, 2 and 3) is journalled in, and projects beyond, the rear wall of said time measuring device or clock mechanism 3 by which said shaft is directly driven in any suitable manner.

The desired speed ratio between the time measuring device 3 and the indicator 5 is readily obtained by providing the concealed end of the tubular shaft 13 with a gear wheel which is in mesh with a gear (not shown) of suitable ratio of said time measuring device.

On the outwardly projecting end of the tubular shaft 13, I mount the driving member 15 of a clutch. Journalled in the tubular shaft 13 is a shaft 17 which extends through the clock mechanism 3 and has an end portion in form of a square shank 19 projecting through the front wall of the casing 1. Mounted on the square shank 19 and abutting the inner surface of the front wall of the casing 1 is a segment 21. The other end of the shaft 17 is journalled in a plate 25 which is suitably secured to the rear wall of the casing 1.

Slidable on the shaft 17 is a driven clutch member 26 which cooperates with the previously described driving clutch member 15 and has a hub 27. In order drivingly to connect the shaft 17 with the driven clutch member 26, yet permit axial movement of the latter relative to said shaft into and out of engagement with the driving clutch member 15, a cross pin 29 of the shaft 17 projects into diametrically opposite slots 31 in the hub 27 of said driven clutch member 26 (Fig. 2). The indicator 5 is provided with a depending arm 33 (Figs. 2 and 3), having at its lower end a collar 35 which is mounted on the shaft 17 in any suitable manner as by the pin 37, for instance.

For engaging the clutch members 15, 26 in order to operate the indicator 5, I provide a key-controlled member 39 which is in the form of a conventional lock barrel (Fig. 5) that is rotatable and axially movable in a guide sleeve 41, mounted with its flange 43 on the inner surface of the front wall of the casing 1 in any suitable manner. A personal key 44 of the driver operates the lock barrel 39.

For controlling the movements of the key-actuated lock barrel 39, the guide sleeve 41 is provided with a bayonet slot 46. A guide pin 45, carried by the lock barrel 39, projects into the bayonet slot 46 whereby axial motion of said lock barrel is obtained when the pin 45 rides in the longitudinal portion of said bayonet slot, and rotation of said lock barrel is obtained when said pin rides in the lateral portion of said bayonet slot.

A compression spring 47 is interposed between the bottom wall 49 of the guide sleeve 41 and the lock barrel 39, normally urging the latter into the inoperative position shown in Fig. 3. Extending through the bottom wall 49 of the guide sleeve 41 is an elongation 51 of the lock barrel 39.

The lock barrel 39 is provided with gear teeth 53 which are in permanent mesh with the rack teeth 55a of a locking bar 55, the former thereby extending through a peripheral slot 67a in the guide sleeve 41. The locking bar 55 is provided with axially alined slots 56 and 57 through which extend guide pins 57 and 58, respectively, which project from the front wall of the casing 1 and guide said bar 55 for linear movement. More particularly, pin 57 is provided with a head 59 and a threaded reduced portion 61 which extends through said front wall and receives a nut 63. A spacer 65a is disposed between the front wall of the casing 1 and the locking bar 55, whereby the latter is guided in spaced relation with said front wall. The other guide pin is of similar construction and mounting.

The lock barrel 39 is also provided on its lower portion with another set of rack teeth 65 which are in permanent mesh with a gear 67, mounted on a shaft 69 as by a pin 71a and projecting through a slot 70 in the guide sleeve 41. The rack teeth 65 extend transversely to the rack teeth 53 and around a substantial portion of the circumference of the lock barrel 39 so as to permit the latter to rotate within limits defined by the lateral portion of the bayonet slide 46 without getting out of mesh with the gear 67. When the lock barrel 39 is moved axially in the guide sleeve 41, its rack teeth 65 rotate the gear 67, while the latter is not rotated when said lock barrel is rotated.

The rotary motion imparted to the gear 67 on depression of the lock barrel 39 into the guide sleeve 41 is utilized for winding the clock mechanism 3. To this end the shaft 69 which is journalled in a bearing 71 of a bracket 73 carries a friction disk 76 (Fig. 1) which is yieldingly urged into driving engagement with another friction disk 79 by a compression spring 77, interposed between the bearing 71 and said friction disk 76. The friction disk 79 is mounted at 83 on a winding shaft 81 for the clock mechanism. This winding shaft 81 is journalled in a bearing 85 on the clock mechanism 3. At its inner end the winding shaft 81 is connected with any suitable driving means, such as bevelled gears (not shown), for winding the clock mechanism in the manner commonly found in watches, for example. With this arrangement, the depression of the lock barrel 39 into the longitudinal position shown in Fig. 5 causes winding of the clock mechanism 3 through intermediation of the friction clutch 76, 79 which provides sufficient slippage to prevent injury to the clock mechanism if the lock barrel 39 should tend to overrun said mechanism on initial depression after installation. Longitudinal movement of the lock barrel 39 in the reverse direction turns the winding shaft 81 in the reverse direction, but has no effect on the clock mechanism 3 because of the customary provision of a one-way clutch (not shown) in the clock-winding drive. Hence, the clock mechanism 3 of the parking meter is automatically wound as the lock barrel 39 is manipulated by the driver with his own key.

An elongated slot 91 is provided in the locking bar 55 through which the shaft 17 projects, permitting longitudinal movement of said bar without interference from said shaft. The locking bar 55 is also provided with a bayonet slot 93 (Fig. 1) which cooperates with a movable latch 95 in order to arrest the locking bar 55 in its left end position. The latch 95 is vertically slidable between horizontally spaced pairs of pins 97 which project from the front wall of the casing 1, and carries a pin 99 which projects into the slot 93 in the locking bar 55. By means of a delicate spring 101 (Fig. 4) the latch 95 is urged upwardly so that its pin 99 enters the vertical portion of the bayonet slot 93 as viewed in Fig. 1 when the locking bar 55 is moved into its left end position, thus arresting said bar 55 in its left end position. A coin slot 100 (Fig. 4) is provided in the front wall of the casing and spaced plates 103 project therefrom inwardly on opposite sides of said coin slot to form a chute in which a coin 102 of a predetermined denomination may be deposited.

A finger 104, which projects from the upper edge of the locking bar 55, slants backwardly and upwardly and is so located on said locking bar that when the same is in its left end position, said finger 104 serves as a stop for the coin 102 in the chute 103. The deposited coin 102 then rests on the movable latch 95 (Fig. 1) and its weight is sufficient to depress said latch so that its pin 99 is moved downwardly in the vertical portion of the bayonet slot 93 of the locking bar 55 and into the horizontal portion of said slot. Thereafter, the locking bar 55 can be moved axially to the right as shown in Fig. 1, whereby the coin retaining finger 104 is carried away from the coin chute 103 and the coin 102 drops into a coin receiving tube 107 which may be provided with downwardly extending flexible spring fingers 109 to prevent unauthorized extraction of coins therefrom. The coin slides through the hollow tube 107 and into a coin bin which is separated from the mechanical structure in the casing 1 by a partition 111. The lower portion of the coin bin may be closed in any desired manner or it may open into any stand or receptacle (not shown) on which the parking meter is mounted.

Having inserted the proper coin 102 into the slot 100 and thereby released the locking bar 55 in its left end position, the operator of the parked automobile first depresses the lock barrel 39 into the longitudinal position shown in Fig. 5 and then turns the same into the angular position shown in this figure by means of his personal key 44, thereby moving the bar 55 to its extreme right end position in which the end of a spring latch 110 (Fig. 7) jumps into a slot 112 in said bar 55 as shown in Fig. 7 and locks the latter in said right end position. The locked bar 55 in its right end position prevents removal of the operator's personal key from the lock barrel 39 as will be more fully explained hereinafter.

The driving connection between the wound clock mechanism 3 and the indicator 5 is initiated on depression of the lock barrel 39 when its elongation 51 rocks a clutch-operating lever 113. The lever 113 is pivotally mounted at 115 and the bifurcated end 119 of its arm 117 straddles an annular groove in the hub 27 of the driven clutch element 26 (Figs. 2 and 3), while a compression spring 120 normally urges said lever 113 in counterclockwise direction as viewed in Fig. 3 and into the clutch-disengaging position shown therein. Hence, when the lock barrel 39 is depressed, its elongation 51 rocks the clutch lever 113 into clutch-engaging position against the compression of the spring 120, and said lever remains in clutch-engaging position while the lock barrel 39 is retained in its depressed position by the bayonet slot 46 and locked in this position by the locked bar 55.

The key-controlled lock barrel 39 is preferably of a conventional construction wherein the personal key 44 controls the position of the tumblers 123 (Fig. 5) in a well known manner. Such lock barrels are readily obtainable on the market and form no part of my invention, wherefore a more specific disclosure and description thereof is deemed unnecessary. It may be stated, however, that the insertion of the personal key 44 serves to retract the lock tumblers 123, whereupon the lock barrel is free to move axially and rotate in the guide sleeve 41. When the key 44 is removed from the lock barrel 39, the tumblers 123 are forced outwardly and into suitable recesses (not shown) in the guide sleeve 41, thereby preventing any movement of said lock barrel in its guide sleeve. After the personal key 44 has been inserted to retract the lock tumblers 123 and the lock barrel 39 has been depressed and rotated to hold it in the meter-operating position shown in Fig. 5, the personal key cannot then be removed therefrom as is usual with locks of this kind.

It is desirable to record or count the number of operations of the parking meter over a period of time. To this end, any well known counter 125 such as a Veeder counter, is mounted on the rear wall of the meter casing by any suitable means such as screws 127 (Fig. 3). The free end of the lock barrel extension 51 carries an arm 129 which is suitably connected with the actuating rod 131 of the counter.

It is also desirable, when the operator of an automobile overstays a predetermined parking period, to provide for collecting a second parking fee before the operator can remove his personally identified key from the meter. To this end, a latch 133 (Figs. 1 and 2) is pivotally mounted at 137 in a slot 135 in the locking bar 55. A sensitive leaf spring 139, carried by the locking bar 55, depends into the slot 135 and engages the latch 133, tending to rotate the same in counterclockwise direction as viewed in Fig. 2. A projecting heel 141 of the latch 133 engages an unlatching member 143 which is suitably guided for vertical movement as viewed in Fig. 2. The upper end of the unlatching member 143 is provided with a lateral U-portion 145 which serves as a coin-receiving tab for operation by a coin of suitable weight. A sensitive leaf spring 147 (Fig. 2) engages the U-portion 145 of the latch member 143 and normally urges the latter upwardly and away from the heel 141 on the latch 133.

The previously mentioned segment 21 (Fig. 1) serves to lock the bar 55 in its right end position after a predetermined parking period has lapsed. This segment 21 is rotated together with the parking time indicator 5 by reason of their common mounting on the common shaft 17, and is provided with a concentric slot 149 which is so spaced from the shaft 17 that it is in alinement with the pivoted latch 133 (Fig. 9) when the bar 55 is in its right end position (Fig. 1). The angular disposition and length of the arcuate slot 149 is so selected that the same moves into registry with the latch 133 after the lapse of the parking period paid for by the first coin, whereupon the latch 133 is spring-urged into latching engagement with said slot 149 and the bar 55 cannot be returned to its left end position by the operator's personal key 44 which can, therefore, not be removed from the lock barrel 39. When this happens, a second parking fee is collected from the operator of the automobile before he is permitted to recover his personal key 44 which is locked in the lock barrel 39 so long as it is held in the angular position shown in Fig. 5.

For collecting the second parking fee, a second coin slot 151 is provided in the front wall of the casing 1 through which a coin of predetermined denomination is deposited. For receiving the coins inserted therein, a chute 153 is provided on the casing 1 in alinement with the coin slot 151. A second coin-holding finger 153a (Fig. 1) projects upwardly from the locking bar 55 and is so disposed that it is in alinement with the coin slot 151 when said bar 55 is in its right end position (Fig. 1). The coin retaining finger 153a is suitably inclined so that a coin deposited in the chute 153 is held therein and rests upon the coin-receiving tab 145 of the unlatching member 143. The spring 147 (Fig. 2) is of such force that a coin of predetermined denomination depresses the unlatching member 143, thereby rocking the latch 133 in the locking bar 55 from latching engagement with the slot 149 in the segment 21 and releasing said locking bar 55 for movement into its left end position.

The locking bar 55 is moved to its left end position by means of a second key-controlled lock barrel 155 (Figs. 1, 3 and 7) which is axially movable and rotatable in a guide sleeve 157, mounted with its flange 158 on the front wall of the casing 1. The lock barrel 155 is provided with gear teeth 155' which are in permanent mesh with rack teeth 159 of the locking bar 55. The lock barrel 155 is preferably of conventional manufacture, and comprises the conventional lock tumblers 160 which are spring-urged in the well known manner to prevent rotation of the lock barrel when the key is removed.

A stem 161 of the lock barrel 155 is free to move beyond the end of the guide sleeve 157 and forces the spring latch 110 from latching engagement with the locking bar 55 after insertion of a suitable key 163 in said lock barrel and consequent retraction of the tumblers 160 and upon depression of said lock barrel against the compression of a spring 164. Thereafter the operator may turn the lock barrel 155 by means of key 163 and thereby move the locking bar 55 from its right end position into its left end position. Such movement of the locking bar 55 causes also rotation of the lock barrel 39 from the locked angular position shown in Fig. 5 into released position in which the pin 45 is located in the longitudinal portion of the bayonet slot 46 and the personal key 44, may be withdrawn by the operator. The key 163, which the operator uses for regaining his personal key 44, is provided in each meter and designated the "meter key". When the locking bar 55 has been returned to its released or left end position, the key 163 has also been rotated into a position in which it is locked in the barrel 155 and the spring 47 forces the lock barrel 39 into its inoperative position, whereby the retracting extension 51 thereof releases the lever 113 from clutch-engaging position. The lever 113 is then immediately spring-urged into the clutch-disengaging position shown in Fig. 3, with the result that the driving connection between the clock mechanism 3 and the parking time indicator 5 is interrupted. The meter key 163, which is locked in its barrel 155 while the parking meter is not in use, is removed from the parking meter by the operator of a parked automobile and carried on his person until he wants to remove his automobile and regain his personal key 44 which has been locked in the parking meter during the parking period.

The parking time indicator 5 is now free to resume its normal or zero position. For restoring the indicator to its normal position, a counter weight 161 is carried on the lower end of an arm 162 (Fig. 2) which depends from the hub 27 of the driven clutch member 26. Also a return spring of any suitable design may be utilized instead of the counter weight 161.

A different embodiment of the present invention may be provided wherein the personal-key controlled lock barrel 39 and the meter-key controlled lock barrel 155 are located in close proximity to each other. To this end, the lock barrel 155 is located vertically above the lock barrel 39 as shown in Fig. 8. In this arrangement, the lock barrel 155 is turned 180 degrees so that its gear teeth 155' project downwardly and are in permanent mesh with rack teeth 171 which are provided at the top surface of the locking bar 55 and take the place of the rack teeth 159 (Figs. 1 and 7). Furthermore, the spring latch 110 is mounted with its upper end at 173 on the front wall of the casing 1, and its lower end is adapted to latch with a slot 175 in the upper portion of the locking bar 55.

The operation of my parking meter, therefore, requires the following operations: (1) Inserting a coin of predetermined denomination through the slot 100 (Fig. 4) to release the locking bar 55; (2) Inserting a personally identified key into the lock barrel 39 to unlock it for depression and rotation whereby depression of said lock barrel causes winding of the clock mechanism 3 and establishes the driving connection between the latter and the parking time indicator 5, while rotation of said lock barrel causes bar 55 to be moved into its right end position and become locked therein; (3) Removal of the meter key 163 from the parking meter by the operator of the parked automobile; (4) Returning to his automobile, the operator reinserts the meter key 163 and depresses and turns the same to unlock bar 55 and turn the same to its left end position, thereby resetting the parking time indicator, releasing the personally identified key for removal by the operator, and locking the meter key in the parking meter; (5) If the operator parks his automobile longer than a predetermined time, he must insert an additional coin of proper denomination into the slot 151 before performing operation number 4.

The present parking meter is preferably installed adjacent the curb, and the street is preferably provided with painted lines for designating the limits of the parking space for the parking meter. It is also preferable to mount the parking meter at the front end of the parking space in order that its presence and purpose will be brought clearly to the attention of an operator when parking his automobile.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

This application is a continuation of my application, Serial No. 116,772, filed December 19, 1936.

I claim:

1. A parking meter having in combination, a time measuring clock mechanism, a parking time indicator, coupling means for operatively connecting said indicator with said mechanism, a rotatable member, means for slidably journalling said member for rotation and reciprocation, means operated by sliding movement of said member for winding said clock mechanism, means also operated by depressing said member for controlling said coupling means to connect the parking time indicator to the clock mechanism, guide means for said member for guiding it in successive motions of reciprocation and rotation and comprising holding means for holding said member in shifted position.

2. A parking meter having in combination, a time measuring device, a parking time indicator, coupling means for driving said indicator from said device, a key actuated member for controlling said coupling means, means for rotatably journalling said member, a holding bar shifted by the rotatable movement of said member, a second key controlled member operatively associated with said holding bar for restoring the same, time controlled latch means associated with said bar, latch receiving means actuated simultaneously with said indicator for receiving the latch means associated with the bar after a predetermined time, and coin controlled means for unlatching said time controlled latch means from interlocked relation with the latch receiving means whereby the indicator of the parking meter may be reset by operation of said second key controlled member.

3. A parking meter having in combination, a time measuring device, a parking time indicator, coupling means for driving said indicator from said device, a key actuated member for controlling said coupling means, means for rotatably journalling said member, a holding bar shifted by the rotatable movement of said member, means for slidably supporting said bar, a second key controlled member operatively associated with said holding bar for restoring the same, latch means connected with and mounted in a cutout portion of said bar, cooperative latch means comprising a segmented disk portion adjacent said bar and actuated simultaneously with said indicator, a slot in said cooperative latch means for receiving the first mentioned latch means after a predetermined time, and coin controlled means for unlatching said latch means from interlocked relation whereby the indicator of the parking meter may be reset by operation of said second key controlled member.

4. A parking meter comprising, in combination, a timing mechanism; a signal, a device operable to connect said signal and mechanism; a lock barrel movable from a normal position to an active position for operating said device; a personal key for moving said lock barrel means for locking said lock barrel in active position; and other means associated with the locking means and manually operable to release said locking means and means acting on said lock barrel when unlocked to return the latter to normal position.

5. The combination in a parking meter as set forth in claim 4, in which said other means comprises a movable lock barrel and a meter key for manipulating the same.

6. A parking meter comprising, in combination, a timing mechanism; a signal, a normally disengaged clutch for drivingly connecting said mechanism and signal; a first axially movable and rotatable lock barrel having peripheral gear teeth and being of the type wherein the key is locked within the barrel upon rotation of the same and operative to cause engagement of said clutch on being moved axially; means holding the lock barrel shifted axially on rotating the same by the movement of a personal key from a key-releasing position into a key-locking position; a second rotatable lock barrel of the same type as the first barrel operable by a meter key and having peripheral gear teeth; and a rack in mesh with the teeth of both barrels so that rotation of either barrel from key-releasing position into key-locking position results in rotation of the other barrel from key-locking position into key-releasing position, and vice versa.

7. The combination in a parking meter as set forth in claim 6, further comprising a latch which normally arrests said rack in the position in which said first barrel is in its key-releasing position, said latch being depressible by the weight of a coin to release said rack.

8. A parking meter comprising, in combination, a timing mechanism; a signal; a normally disengaged clutch for drivingly connecting said mechanism and signal; an axially movable and rotatable lock barrel of the type wherein the key is locked within the barrel upon rotation of the same and having peripheral gear teeth and being adapted to cause engagement of said clutch on being axially moved; means holding the lock barrel in shifted position on rotating the same by a personal key from a key-releasing position into a key-locking position; a movable rack in mesh with said barrel teeth; latch means on said rack, latch receiving means actuating simultaneously with said signal for receiving the latch means on the rack to hold the barrel in key-locking position after a predetermined time of operation of said signal, said latch being depressible by the weight of a coin to release said rack.

9. In a parking meter, operating means for rendering said meter operative and inoperative, comprising a pair of spaced lock mechanisms each including a lock barrel mounted for rotation between its locking and unlocking positions, an operating key for each barrel, and means for causing rotation of either barrel in response to rotation of the other barrel, said barrels being arranged relatively so that when one is rotated from its locking to its unlocking position the other is rotated from its unlocking to its locking position to permit removal from and insertion in said other barrel of its key.

10. In a parking meter, operating means for rendering said meter operative and inoperative, means for locking said operating means, and coin controlled means for unlocking said operating means, said operating means comprising a pair of spaced lock mechanisms each including a lock barrel mounted for rotation between its locking and unlocking positions, an operating key for each barrel, and means for causing rotation of either barrel in response to rotation of the other barrel, said barrels being arranged relatively so that when one is rotated from its locking to its unlocking position the other is rotated from its unlocking to its locking position to permit removal from and insertion in said other barrel of its key.

11. In a parking meter, operating means for rendering said meter operative and inoperative, and locking means controlled by said operating means to lock the latter when said operating means is actuated to render said meter operative and to unlock said operating means when the latter is actuated to render said meter inoperative, said operating means comprising a pair of spaced lock mechanisms each including a lock barrel mounted for rotation between its locking and unlocking positions, an operating key for each barrel, and means for causing rotation of either barrel in response to rotation of the other barrel, said barrels being arranged relatively so that when one is rotated from its locking to its unlocking position to render said meter operative the other barrel is rotated from its unlocked to its locked position to permit removal from and insertion in the thus locked barrel of its key.

12. In a parking meter, operating means for rendering said meter operative and inoperative, locking means controlled by said operating means to lock the latter when said operating means is actuated to render said meter operative and to unlock said operating means when the latter is actuated to render said meter inoperative, additional means for locking said operating means, and coin controlled means for actuating said additional means to unlock said operating means, said operating means comprising a pair of spaced lock mechanisms each including a lock barrel mounted for rotation between its locking and unlocking positions, an operating key for each barrel, and means for causing rotation of either barrel in response to rotation of the other barrel, said barrels being arranged relatively so that when one is rotated from its locking to its unlocking position to render said meter operative the other barrel is rotated from its unlocked to its locked position to permit removal from and insertion in the thus locked barrel of its key.

13. In a parking meter, operating means for rendering said meter operative and inoperative, timing mechanism, means for locking said operating means including a pair of members one of which is mounted for movement into and out of locking relation to the other, means adapted to be actuated by said operating means to connect said timing mechanism with said movable member to move the latter into said locking relation to the other member and disconnect said timing mechanism, and movable member, and coin controlled means for unlocking said operating means, said operating means comprising a pair of spaced lock mechanisms each including a lock barrel mounted for rotation between its locking and unlocking positions, an operating key for each barrel, and means for causing rotation of either barrel in response to rotation of the other barrel, said barrels being arranged relatively so that when one is rotated from its locking to its unlocking position the other is rotated from its unlocking to its locking position to permit removal from and insertion in said other barrel of its key.

OTTO C. JENSEN.